United States Patent [19]

Hindin et al.

[11] 4,091,086

[45] May 23, 1978

[54] PROCESS FOR PRODUCTION OF HYDROGEN

[75] Inventors: Saul G. Hindin, Mendham; Joseph C. Dettling, Jackson, both of N.J.

[73] Assignee: Engelhard Minerals & Chemicals Corporation, Iselin, N.J.

[21] Appl. No.: 752,010

[22] Filed: Dec. 20, 1976

[51] Int. Cl.$^2$ .............................. C01B 1/05; C01B 1/08
[52] U.S. Cl. .................. 423/648 R; 252/373; 252/463; 423/656
[58] Field of Search .................. 423/648, 655, 656; 252/373, 463, 475, 462, 461

[56] References Cited

U.S. PATENT DOCUMENTS

| | | | |
|---|---|---|---|
| 2,279,198 | 4/1942 | Huppke | 252/462 |
| 2,425,625 | 8/1947 | Larson | 423/648 R |
| 3,388,972 | 6/1968 | Reitmeier et al. | 252/463 X |
| 3,546,140 | 12/1970 | Gutmann et al. | 423/656 X |
| 3,615,166 | 10/1971 | Hindin et al. | 252/462 |
| 3,894,140 | 7/1965 | Warshaw | 252/463 X |
| 3,961,037 | 1/1976 | Davies et al. | 423/656 |

FOREIGN PATENT DOCUMENTS

| | | | |
|---|---|---|---|
| 1,010,574 | 11/1965 | United Kingdom | 423/648 R |

*Primary Examiner*—Edward J. Meros

[57] ABSTRACT

Catalytic compositions particularly useful in the production of hydrogen from methanol, especially by steam reforming, which comprises a mixture of zinc oxide, copper oxide, thorium oxide and aluminum oxide whereby the activity and activity maintenance of the catalytic composition is superior relative to a composition otherwise substantially the same but lacking thoria.

9 Claims, No Drawings

PROCESS FOR PRODUCTION OF HYDROGEN

This invention relates to catalytic compositions, and to catalytic compositions useful in the production of hydrogen from methanol, especially by steam reforming.

Hydrogen may be produced by steam reforming methanol by reacting it with steam in the presence of a catalyst at elevated temperatures. In this process, a mixture of the methanol and steam is converted to a gaseous stream containing hydrogen, carbon dioxide, carbon monoxide, water vapor and, depending upon the efficiency of the process and the conditions at which it is performed, minor amounts of unconverted methanol and reaction products. Water and carbon dioxide may be readily removed from the gaseous product stream to increase the concentration of hydrogen. Carbon monoxide is considerably more difficult to remove, however, and it is therefore known to further treat the gaseous product stream under conditions which bring about a "water gas shift reaction" wherein carbon monoxide and steam are converted to carbon dioxide and hydrogen. The carbon dioxide, as previously noted, is an easily removed material. In this manner, the yield of hydrogen from the feedstock may be maximized.

In order to optimize the economics of the process, it is desirable to conduct the process in a single stage utilizing a catalytic composition for both the initial decomposition of the methanol feedstock and in the shift reaction. Such a catalytic composition, to be commercially attractive, should preferably maintain its activity in catalyzing both reactions over extended periods of use.

The water gas shift reaction employs a shift catalyst which normally is different than the catalyst employed in the initial decomposition reaction. The water gas shift reaction is an equilibrium reaction wherein the conversion of water and carbon monoxide to hydrogen is favored as the temperature is decreased. Many of the prior art shift catalysts, such as iron-chromium catalysts, however, are ineffective at these desired low temperatures, for example, below 700° F. Catalytic compositions composed of mixtures of copper oxide and zinc oxide are known in the art to promote the water gas shift reaction at temperatures lower than those typically utilized for iron-chromium shift catalysts. Thus, U.S. Pat. No. 1,797,426 discloses a reduced copper oxide/zinc oxide catalyst useful at shift reaction temperatures of 570° F and higher. U.S. Pat. No. 3,303,001 discloses a catalyst useful in bringing about the water gas shift at even lower temperatures, for example, temperatures below about 500° F and 550° F. These catalyst compositions are prepared from a specially derived zinc oxide and copper oxide mixture which is reduced to provide an active shift catalyst of zinc oxide and copper.

While the above catalysts disclosed in U.S. Pat. No. 3,303,001 permit the shift reaction to proceed at desirably low temperatures, they have proven to be adversely sensitive to temperatures at the upper end of their useful temperature range. Exposure of these catalysts to temperatures above about 500° F for any significant period of time reduces the effectiveness and life of the catalyst. Since disruptions may occur which may expose the shift catalyst to temperatures about 500° F, irreparable injury to the catalyst may occur such that, upon return of the reaction to the useful temperature range of the shift catalyst, the previously-described desirable activity of the catalyst in this range no longer exists. Additionally, since the water gas shift reaction is exothermic, the appearance of excessive carbon monoxide in the reaction feed stream causes a rapid rise in temperature which may injure the catalyst in the same manner as previously described.

Moreover, a shift catalyst, to be useful for the initial reforming of a methanol feedstock, is desirably active at, and additionally not irreparably damaged by, temperatures about 500° F since, in general, higher temperatures favor the initial conversion of the methanol to hydrogen.

U.S. Pat. No. 3,388,972 describes a copper/zinc oxide shift catalyst possessing improved resistance to the loss of activity resulting from the exposure to temperature above about 500° F by reason of the inclusion of alumina with the active catalytic components. However, the catalyst compositions described in U.S. Pat. No. 3,388,972, while resistant to adverse temperature effects, do not result in the economical conversion of methanol feedstocks to hydrogen and furthermore, are characterized by an uneconomically short life on account of relatively poor activity maintenance.

In accordance with this invention it has been discovered that a catalytic composition comprised of zinc oxide, copper oxide, thorium oxide and aluminum oxide is an effective catalyst for the steam reforming of methanol to produce hydrogen. The inclusion of thoria results in improved activity and activity maintenance relative to a catalytic composition substantially the same but lacking thoria.

In the catalytic composition, thoria is present in an amount of not less than about 0.5% by weight of the overall catalytic composition, and there appears to be no economic justification to use more than 10%. Preferably, the catalyst comprises from about 1 to about 5% by weight thoria. A catalyst containing less than 0.5% thoria results in decreased activity and decreased stability. The alumina component of the catalytic composition is in the range of from about 25% to about 60% by weight of the overall composition, and preferably in the range of from about 40–50%. If the catalyst contains less than 25% alumina, the activity and stability decrease, and if more than 60% the activity decreases. The weight ratio of zinc oxide to copper oxide is maintained within the range from about 1:2 to about 3:1.

The process of the present invention comprises converting methanol to hydrogen by passing a mixture of methanol and steam over the above-described thoria-containing catalytic composition at elevated temperatures. This steam reforming of methanol may be carried but in a single-stage reaction since the catalytic composition of this invention catalyzes both the decomposition of methanol and the water gas shift reaction.

The present invention further comprises bringing about the water gas shift reaction, i.e., converting a gaseous mixture of carbon monoxide and water to hydrogen and carbon dioxide, utilizing the above-described thoria-containing catalytic composition. Thus, the thoria-containing catalytic composition of the present invention may be utilized to maximize the concentration of hydrogen in gaseous product streams resulting from the steam reforming of methanol.

The catalytic compositions of the present invention, comprised of zinc oxide, copper oxide, alumina and thoria, may be prepared according to a variety of known techniques. In a preferred procedure, an aqueous slurry of alumina and a water soluble thorium salt such as thorium nitrate is prepared which is converted to a gel-like mixture upon the addition of ammonium hydroxide. An aqueous solution containing both copper and zinc salts, preferably nitrates, is then added to the gel, followed by a further addition of ammonium hydroxide. After suitable mixing and drying, the mixture is calcined in air at temperatures in the range of about 400°–600° C. The amounts of the copper and zinc salts are chosen so as to result in a final catalytic composition containing a weight ratio of about 0.5 to 3 parts zinc oxide to one part copper oxide.

As used herein, alumina is intended to describe the variety of transitional aluminas available for catalytic uses. Transitional aluminas are metastable forms which, in general, are produced by the heating of alpha or beta alumina trihydrates or monohydrates. Several different transitional aluminas result from the overall transition of alpha and beta alumina trihydrate and are known as gamma, delta, eta, theta, kappa, chi and rho alumina.

The catalytic composition of this invention is, as previously noted, an effective catalyst for the steam reforming of methanol, and for the water gas shift reaction. In a typical hydrogen production process, methanol is passed with steam over the catalyst at pressures typically ranging from about 20 to about 100 psig. and temperatures in the range of about 300° F to about 800° F. Typical steam to methanol mole ratios ($H_2O$/carbon) are in the range of about 0.5:1 to about 4:1. The conversion of methanol to hydrogen may be effected in one pass over the catalyst composition.

Additionally, since the catalytic compositions of this invention are highly efficient shift catalysts, they may be utilized in the later stages of a multi-stage process wherein the initial decomposition of methanol is accomplished utilizing a different catalyst such as a supported group VIII metal. For example, the gaseous product stream resulting from the steam reforming of hydrocarbons, comprising carbon monoxide and water vapor, can be passed over the catalytic composition of the present invention at temperatures in the range of from about 300° F to about 800° F, preferably in the range of from about 450° F to about 650° F.

The improved activity and activity maintenance of the catalytic compositions of this invention may be illustrated by the steam reforming of methanol.

A number of catalytic compositions were prepared as follows:

Sample 1

To 2381 grams of an alumina-containing slurry (10.5% solids by weight) was added 50 mls. of concentrated ammonium hydroxide to form a thick gel having a pH of 7.5. A solution of copper and zinc salts (452 grams CU $(NO_3)_2 \cdot 3H_2O$ and 366 grams $Zn(NO_3)_2 \cdot 6H_2O$ in 500 mls. water) was added to the gel and mixed therewith. Ammonium hydroxide was then added to a pH of 4.3. The mixture was dried for 2 days at 110° C, subdivided and calcined in air for 2 hours at 500° C and pelleted. On a dry weight basis the catalytic composition contained 30% copper oxide, 20% zinc oxide, and 50% alumina.

Sample 2

To 2333 grams of the alumina slurry utilized in the preparation of Sample 1 was added a solution of 10.5 grams $Th(NO_3)_4 \cdot 4H_2O$ in 500 mls. of water. The slow addition of 35 cc. concentrated ammonium hydroxide resulted in the formation of a thick gel. The identical quantity of zinc and copper nitrate solution utilized in Sample 1 was then added to the gel and mixed therewith. 75 mls. of concentrated ammonium hydroxide was then added and the resultant mixture dried overnight at 85° C. The sample was then mulled with 190 ml. water and extruded. The extrudate was dried overnight at 110° C and then calcined in air for 2 hours at 500° C.

The catalytic composition contained 30% copper oxide, 20% zinc oxide, 49% alumina, and 1% thoria on a dry weight basis.

Sample 3

To a mixture of 2143 grams of the alumina slurry utilized in the preceding sample preparations and a solution of 52.5 grams $Th(NO_3)_4 \cdot 4H_2O$ 500 ml. water, was slowly added 175 ml. concentrated ammonium hydroxide. To the resulting gel was added and mixed the identical quantity of zinc and copper nitrate solution utilized in Sample 1 and Sample 2. Ammonium hydroxide was then added (75 ml.) and the mixture was dried overnight at 110° C, subdivided and calcined at 500° C in air for 2 hours. The sample was then pulverized and pelleted.

The catalytic component contained 30% copper oxide, 20% zinc oxide, 45% alumina and 5% thoria on a dry weight basis.

The foregoing samples were used in the reforming of methanol at 30 psig., a steam to carbon on ratio of 3:2, and a weight hourly space velocity of 1. The conversion results are summarized in Table I.

TABLE I

| Catalytic Composition | Reactor Inlet Temperature (20°C) | Run Duration (hrs.) | Percent Conversion of Methanol | | Gaseous Product Composition (Mole %, Water-Free Basis) | | | |
|---|---|---|---|---|---|---|---|---|
| | | | Initial | Final | $CO_2$ | CO | $CH_4$ | $H_2$ |
| Sample 1 (no thoria) | 300–330 | 162 | 67 | 39 | 22.5 | 0.7 | 0 | 76.8 |
| Sample 2 (1% $ThO_2$) | 300 | 708* | 98 | 70 | 23.5 | 1.2 | 0.02 | 75.3 |
| Sample 3 (5% $ThO_2$) | 300–330 | 239 | 99 | 95 | 24.0 | 2.8 | 0 | 73.2 |

*Regenerated at 440 hours when conversion dropped to 83%

As indicated in Table I, both compositions containing thoria resulted in a significant improvement in the overall conversion of methanol. The catalytic compositions of the present invention result in a higher initial conversion of the methanol feedstock to the desired product composition, and the improved conversion is maintained over extended periods of operation. The catalytic compositions of the present invention display significantly improved activity maintenance relative to compositions otherwise the same but lacking thoria and, hence do not require repeated costly regenerative procedures.

While the present invention has been described with respect to certain preferred catalytic compositions and the preparation and use thereof, it will be apparent to those skilled in the art that the various modifications and alterations are ascertainable without departing from the scope and spirit of the invention as defined by the appended claims.

What is claimed is:

1. A process for producing hydrogen from methanol wherein a feedstock comprising methanol and steam is passed over a catalytic composition consisting essentially of zinc oxide, copper oxide, thorium oxide and aluminum oxide at a temperature in the range of from about 300° F to about 800° F and a pressure of from about 20 to 100 psig, whereby the activity maintenance of the composition for said process is superior relative to a composition substantially the same but lacking thoria.

2. The process of claim 1 wherein said thoria is present in the range of from about 0.5% to about 10% by weight of the catalytic composition.

3. The process of claim 1 wherein said thoria is present in the range of from about 1% to about 5% by weight of the catalytic composition.

4. The process of claim 1 wherein said aluminum is present in the range of from about 25% to about 60% by weight of the catalytic composition.

5. The process of claim 1 wherein the weight ratio of zinc oxide to copper oxide in said catalytic composition is in the range of from about 1:2 to about 3:1.

6. A process for producing hydrogen from a gaseous mixture containing at least steam and carbon monoxide which comprises contacting said gaseous mixture with a catalytic composition consisting essentially of zinc oxide, copper oxide, thoria and alumina at a temperature in the range of from about 300° F to about 800° F, whereby the activity maintenance of the composition for said process is superior relative to a composition substantially the same but lacking thoria.

7. The process of claim 6 wherein said thoria is present in the range of from about 0.5% to about 10% by weight of the catalytic composition.

8. The process of claim 6 wherein said thoria is present in the range of from about 1% to about 5% by weight of the catalytic composition.

9. The process of claim 6 wherein said alumina is present in the range of from about 25% to about 60% by weight of the catalytic composition.

* * * * *

UNITED STATES PATENT AND TRADEMARK OFFICE
CERTIFICATE OF CORRECTION

PATENT NO. : 4,091,086
DATED : May 23, 1978
INVENTOR(S) : HINDIN, Saul G. and DETTLING, Joseph C.

It is certified that error appears in the above-identified patent and that said Letters Patent are hereby corrected as shown below:

In Column 4, after line 40, in Table I, the second column heading "Reactor Inlet Temperature (20°C)"

should be changed to --Reactor Inlet Temperature (°C.)--

Signed and Sealed this

Fifth Day of June 1979

[SEAL]

Attest:

RUTH C. MASON
Attesting Officer

DONALD W. BANNER
Commissioner of Patents and Trademarks